United States Patent [19]
Buelow et al.

[11] 3,788,610
[45] Jan. 29, 1974

[54] LUBRICANT SYSTEM FOR DRIVE AND SUPPORT OF CONCRETE MIXER DRUM

[75] Inventors: William H. Buelow, Brookfield; William J. Mohrbacker, Milwaukee; George Mihulowicz, Greendale, all of Wis.

[73] Assignee: Rexnord Inc., Milwaukee, Wis.

[22] Filed: June 27, 1972

[21] Appl. No.: 266,775

[52] U.S. Cl......... 259/177, 184/6.12, 259/DIG. 16, 308/187
[51] Int. Cl. ............................................. B28c 5/18
[58] Field of Search............ 308/187; 184/6 R, 6.12; 259/176, 177

[56] References Cited
UNITED STATES PATENTS

| | | | |
|---|---|---|---|
| 3,658,303 | 4/1972 | Funk | 259/177 R |
| 3,112,417 | 11/1963 | Tamm | 308/187 X |
| 2,563,336 | 8/1951 | Jaeger | 259/177 R |
| 3,108,839 | 10/1963 | Johnson | 308/187 |

*Primary Examiner*—Manuel A. Antonakas
*Attorney, Agent, or Firm*—Sughrue, Rothwell, Mion, Zinn & Macpeak

[57] ABSTRACT

A lubricant system for the front end drive and support of a truck mounted concrete mixer includes a lubricant chamber enclosing the drive connection between the drive shaft and drum with a seal for escape of excess lubricant positioned between the drum head and a spherical surface on a stationary gear housing. Grease connections with lubricant passages leading from the gear housing to a rear shaft support bearing and from the drum head to a spherical drum support bearing provide lubricant for these bearings which then passes to the lubricant chamber. A drum retaining arrangement on the rear end of the support shaft is lubricated from a spherical support bearing and a lubricant return passage connects to the lubricant chamber.

7 Claims, 2 Drawing Figures

PATENTED JAN 29 1974　　　　　　　　　　3,788,610

3,788,610

LUBRICANT SYSTEM FOR DRIVE AND SUPPORT OF CONCRETE MIXER DRUM

BACKGROUND OF THE INVENTION

1. Field of the Invention

This invention relates to improvements in lubricating systems for front end drive and support of truck mounted concrete mixer drums.

2. Prior Art

It is known in the prior art to support and drive a concrete mixer drum mounted on a truck with the drum head inclined forwardly, driven from the front, and supported on the drive shaft, together with means for allowing misalignment between the drum and drive shaft due to flexibility in the truck mounting the drum. In these prior art arrangements, however, there is no means to positively supply lubricant such as by grease fittings and passages to the main drum support, the driving coupling, or the bearing supporting the drive shaft. There is a need for such a lubrication system in the art.

SUMMARY OF THE INVENTION

This invention provides an unique arrangement for lubricating the drum spherical support bearing, the rearmost drive shaft support bearing, and the drive coupling for a front end driven and supported mixer drum. Specifically, grease connections in the gear housing and drum connect through lubricant passages to the rear drive shaft support bearing and the spherical drum support bearing respectively. These bearings are in turn in fluid communication with the chamber surrounding the drive connection so that lubricant passing from the bearings lubricates the drive connection. The drive connection chamber is sealed by a lip seal carried by the drum and sealing on a spherical surface of the gear housing having its curvature at the center of load. A drum retainer arrangement between the rear end of the drive shaft and the drum is lubricated from the spherical drum support bearing with excess lubricant returning through a passage in the drum head to the lubricant chamber surrounding the drive connection.

DETAILED DESCRIPTION OF THE PREFERRED EMBODIMENT

Figure 1:
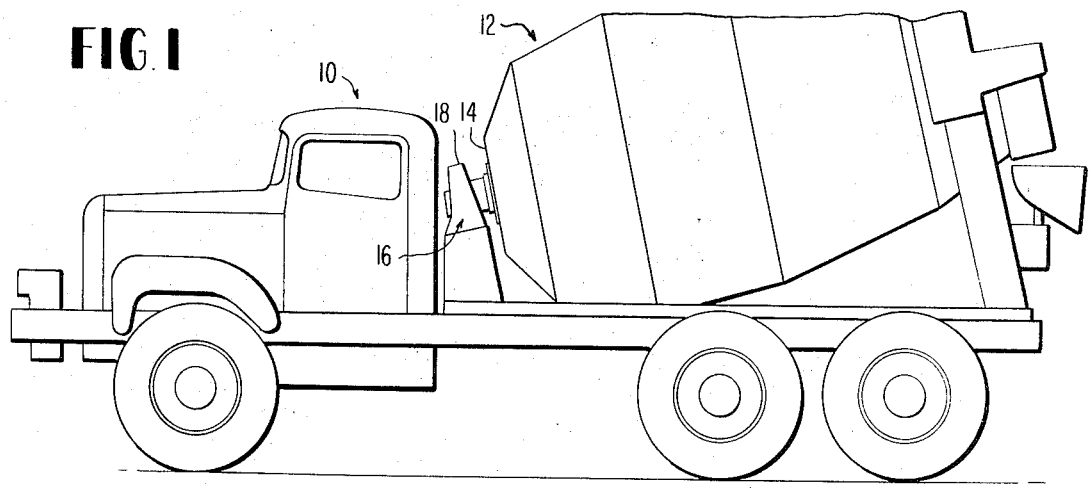
FIG. 1 is a side elevation view of a truck mixer incorporating the lubricant system of this invention for its drive and support system.

Referring to FIG. 1, a truck 10 carries a concrete mixer drum 12 having its head 14 positioned forwardly of the truck and inclined downwardly as is known in the art. The drum is driven by a gear reduction unit drive assembly 16 contained within the gear housing 18.

Figure 2:
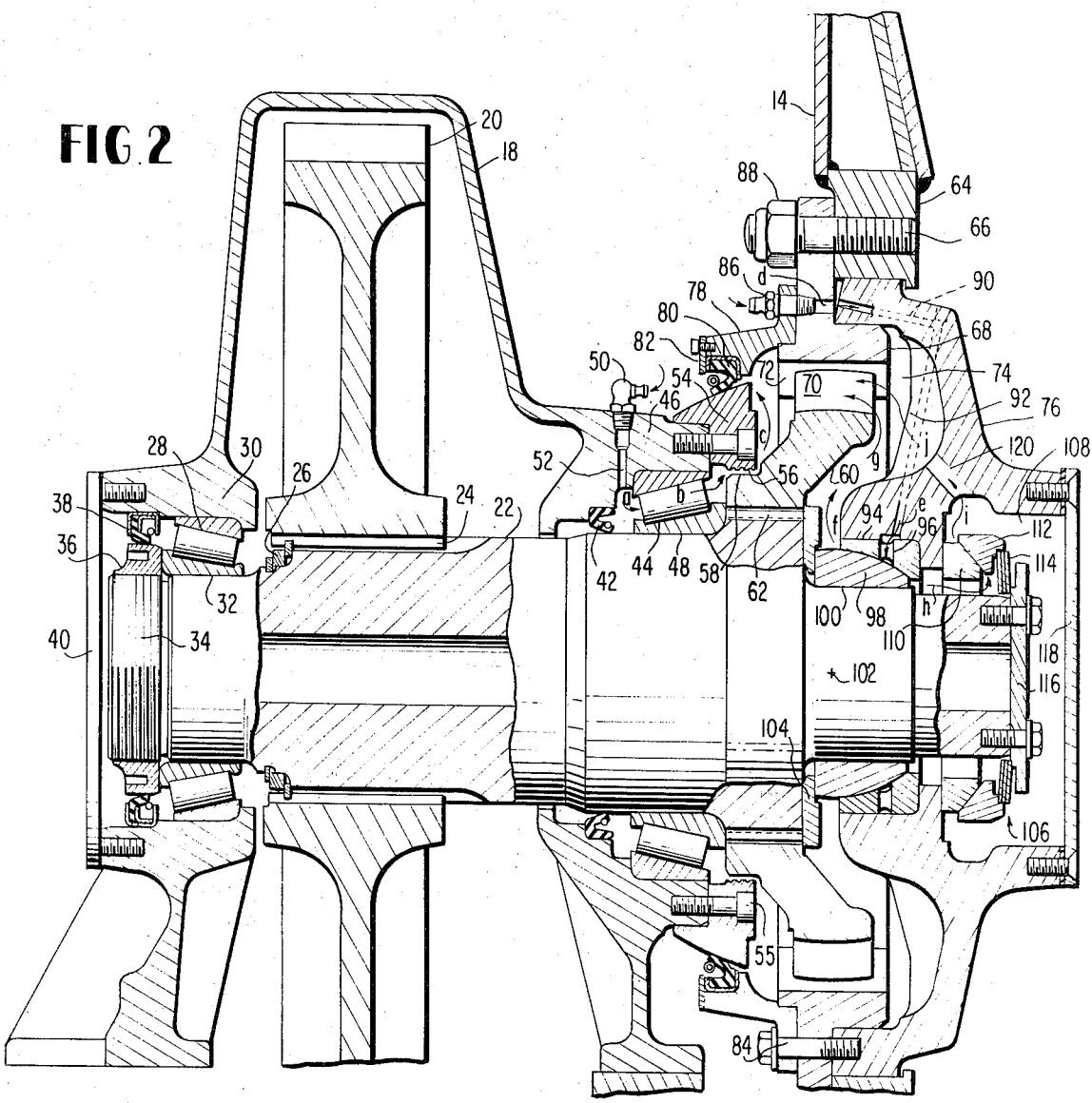
FIG. 2 is an enlarged detailed sectional elevation view illustrating the lubricant system for the drum drive and support arrangement.

Referring to FIG. 2, a final drive gear 20 of the gear reduction unit is mounted on the main drive shaft 22 by a spline arrangement 24 and retainer rings 26.

A tapered roller bearing 28 is the forward support bearing for the drive shaft 22 and is mounted in a boss 30 in the gear housing 18 and supported on surface 32 of the shaft 22. The forwardmost end of shaft 22 has a threaded portion 34 for receiving a stake nut 36 to hold and adjust the bearing 28. An oil seal 38 is positioned between the stake nut 36 and the housing boss 30 and a cover plate 40 is attached by screws to the housing boss.

An oil seal 42 positioned rearwardly on shaft 22 is between the gear housing 18 and the drive shaft 22 and defines the rearmost portion of the lubrication system of this invention. A tapered roller bearing 44 constitutes the rearward support bearing for the drive shaft 22 and is mounted in a housing boss 46 and on shaft surface 48. A grease fitting 50 screwed into the housing boss 46 connects into a lubricant passage 52 in fluid communication with the rearward bearing 44.

A ring 54 is attached to the gear housing 18 by screws 55 extending into boss 46 and defines a labyrinth oil seal passage between its grooved surface 56 and a surface 58 of external drive flange 60.

The external drive flange 60 is attached to the drive shaft 22 by a spline connection 62.

The drum head 14 carries a mounting ring 64 welded thereto which in turn has studs 66 extending outwardly for the mounting of an internal drive flange 68. Nuts 68 secure the internal drive flange to the drum. Gear teeth 70 and 72 on the internal and external drive flanges 60 and 68 respectively constitute the drive connection between the drive shaft 22 and the drum 14 and are formed to allow for the normal misalignment which the drum encounters in use.

A main lubrication chamber 74 surrounds the drive connection formed of internal and external drive flanges 68 and 60 and is defined on one side by a drum head hub 76 and on the other side by a seal housing 78. A flange-type seal 80 is carried by the oil seal housing 78 and retained therein by a cover ring 82. Srews 84 hold the housing 78 to the internal drive flange 68 and the drum hub 76.

A grease fitting 86 screwed through the oil seal housing 78 and into the internal drive flange 68 connects with a lubricant passage 90. This lubricant passage extends through hub 76 and then through a web 92 of the hub 76 and leads to the outer portion 94 of a spherical bearing. A lubricant passage 96 in this spherical bearing connects the lubricant to the bearing surface. An inner spherical bearing portion 98 is mounted on shaft surface 100. The curvature of the spherical bearing surfaces is on a radius from the center of load 102 so that as the drum is misaligned due to any limberness or flexibility of the truck during the drive, the outer spherical bearing portion 94 attached to the drum will move relative to the inner spherical bearing surface part 98 carried by the drive shaft 22. A spacer 104 is positioned between the inner spherical bearing portion 98 and the external drive flange 60.

A retainer means or arrangement 106 is provided for assisting gravity in retaining the drum onto the part spherical bearing. This retainer arrangement is within a chamber 108 in the drum hub 76 and includes an inner spacer 110, an outer spacer 112, and Belleville washers or spacer members 114 between the outer spacer and end plate 116 screwed into the end of shaft 22. The inner spacer 110 may radially float and the surfaces between the two spacers are on a curve with its center of curvature at the center of load. A cover plate 118 defines one wall of chamber 108 and a return lubricant passage 120 is contained in the hub 76 connecting chamber 108 with main lubricant chamber 74.

The gear case to the left of oil seal 42 as shown in FIG. 2 is oil lubricated whereas the lubricant system of this invention contemplates grease lubrication of the rearmost support bearing 44, the main drum spherical support bearing 94, 98 and the drive connection 60, 68.

In operation, lubricant is injected through grease fitting 50 into passage 52 and passes in the direction of arrow a through the tapered roller bearing 44 due to oil seal 42 blocking its passage to the left as viewed in FIG. 2. The lubricant passes along the path indicated by arrow b through the labyrinth defined between surfaces 56 and 58 and then in the direction of arrow c into chamber 74. When chamber 74 is filled with lubricant, excess lubricant can pass out under the lip seal 80 bearing against spherical surface of ring 54. This spherical surface also has its center at the center of load 102. This arrangement, including the labyrinth, maintains adequate lubrication for the bearing 44, insuring that it does not run dry.

Additional grease is then injected into grease fitting 86 where it passes into passage 90 as indicated by arrow d. It then passes through the radially directed leg of passage 90 as indicated by arrow e into lubricant passage 96 and lubricates the bearing surfaces of the part spherical bearing parts 94 and 98. Lubricant escapes from these bearing surfaces and passes as indicated by arrow f outwardly into chamber 74. Some of this grease will pass through the mating teeth 70 and 72 of the drive connection as indicated by arrow g and the excess will escape through the lip seal 80.

For lubricating the retainer means 106 lubricant escapes from the rear end of spherical bearing 94, 98 as indicated by arrow h and passes between the spacers 110 and 112 lubricating the same as they move, it then passes as indicated by arrow i through passage 120 in hub 76 and then as indicated by arrow j through the drive arrangement and any excess passes out the lip seal 80.

As can be seen by this arrangement of lubricating, both bearings, the rearmost support bearing for the main shaft and the spherical support bearing for the drum are positively lubricated by grease and excess grease passes into a main lubricant chamber surrounding the drive connection of the internal and external drive flanges 68 and 60 and excess grease, indicating that the entire assembly is greased, passes out through lip seal 80 bearing against spherical surface of ring 54.

We claim:

1. A lubricant system for a concrete mixer drum front end drive which includes: a drive shaft rotatably supported by forward and rearward bearings within a gear housing, a mixer drum supported at its head at its forward end on a spherical support bearing surface carried by the drive shaft, and a drive connection from the drive shaft to the drum head positioned between the spherical bearing and the rearward support bearing in the plane of the center of load of the drum, the lubricant system comprising: a seal extending between the gear housing and drive shaft between the forward and rearward bearings, a grease fitting and passage in the gear housing to a space in front of the seal and in fluid communication with the rearward bearing, a labyrinth restricting passage for grease between the rearward bearing and the drive connection, another grease fitting connected to a passage in the head of the drum and in fluid communication with the spherical bearing surface, a chamber enclosing the drive connection defined by the head of the drum and a portion of the rearmost surface of the gear housing, and a seal at the juncture of the chamber between the gear housing and the drum head.

2. A lubricant system as defined in claim 1 wherein the last recited seal is a lip seal carried by the drum head with its lip in contact with the spherical surface of the gear housing having its center concentric with the center of the spherical support bearing.

3. A lubricant system as defined in claim 2 wherein the spherical surface of the gear housing is on a separate ring shaped member attached to the housing.

4. A lubricant system as defined in claim 3 wherein the labyrinth passage is defined by a portion of the surface on the separate ring shaped member attached to the gear housing.

5. A lubricant system as defined in claim 1 wherein the mixer drum further includes retainer means between the rear end of the support shaft in the drum head for applying a force tending to hold the drum onto the spherical support bearing, and the lubricant system further comprises a chamber in the drum head in communication with the spherical support bearing to receive lubricant therefrom, the chamber containing the retainer means, and a return passage from the drum head chamber to the chamber enclosing the drive connection.

6. A lubricant system for a concrete mixer drum drive which includes: a drive shaft rotatably supported by first and second bearings within a gear housing, a mixer drum supported at its head end on the drive shaft, and a drive connection from the drive shaft to the drum head positioned between the end of the drive shaft and the second support bearing, the lubricant system comprising: a seal extending between the gear housing and drive shaft between the first and second bearings, a grease fitting and passage in the gear housing to the space between the seal and second bearing and in fluid communi-cation with the second bearing, a chamber adjacent the drive connection defined by the head of the drum and a portion of the rearmost surface of the gear housing, and a seal at the juncture of the chamber between the gear housing and drum head.

7. A lubricant system for a concrete mixer drum drive as in claim 6 further comprising a labyrinth restricting passage for grease between the second bearing and the chamber.

* * * * *